(12) United States Patent
Byrne et al.

(10) Patent No.: US 6,424,893 B1
(45) Date of Patent: Jul. 23, 2002

(54) MILEAGE AND FUEL PURCHASE MONITORING DEVICE FOR VEHICLES

(76) Inventors: Patrick Byrne; Edward Barnes; Edward Nolan, all of 28 Barker St., Mt. Kisco, NY (US) 10549

( * ) Notice: Subject to any disclaimer, the term of this patent is extended or adjusted under 35 U.S.C. 154(b) by 0 days.

(21) Appl. No.: 09/667,465

(22) Filed: Sep. 22, 2000

(51) Int. Cl.[7] .......................... G06F 19/00; G08G 1/017
(52) U.S. Cl. ............................ 701/35; 701/36; 701/25; 701/200
(58) Field of Search ................. 701/35, 36, 1, 701/25, 29, 200

(56) References Cited

U.S. PATENT DOCUMENTS

| | | | |
|---|---|---|---|
| 4,067,061 A | 1/1978 | Juhasz | 364/900 |
| 5,359,528 A | 10/1994 | Haendel et al. | 364/424.04 |
| 5,568,390 A | * 10/1996 | Hirota et al. | 701/201 |
| 5,633,622 A | 5/1997 | Patterson | 340/309.15 |
| 5,911,773 A | * 6/1999 | Mutsuga et al. | 701/200 |
| 5,928,291 A | * 7/1999 | Jenkins et al. | 701/1 |
| 5,991,689 A | * 11/1999 | Aito et al. | 701/209 |

* cited by examiner

Primary Examiner—William A. Cuchlinski, Jr.
Assistant Examiner—Olga Hernandez
(74) Attorney, Agent, or Firm—Goldstein & Lavas, P.C.

(57) ABSTRACT

A mileage and fuel purchase monitoring device for vehicles including a data collecting system that is connected with an odometer of a truck or other motor vehicle. The data collecting system is preferably secured to a dashboard of the truck for easy access by the driver. The data collecting system is provided with a keyboard and a display for entering relevant information related to a planned trip to be made.

6 Claims, 3 Drawing Sheets

MILEAGE AND FUEL PURCHASE MONITORING DEVICE FOR VEHICLES

BACKGROUND OF THE INVENTION

The present invention relates to a mileage and fuel purchase monitoring device for vehicles and more particularly pertains to allowing a vehicle's mileage and fuel purchases to be electronically monitored and stored.

The use of electronic information systems for vehicles is known in the prior art. More specifically, electronic information systems for vehicles heretofore devised and utilized for the purpose of monitoring vehicle information are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,067,061 to Judasz discloses a system for monitoring and recording such information as the state of operation, mileage, fuel consumption and fuel purchased to comply with the U.S. Department of Transportation requirements. Judasz appears to show the use of a digital tape recorder and includes a control module with a manual input device, data entry buttons and means to print out a report. U.S. Pat. No. 5,359,528 to Haendful discloses means to record a truck's mileage within a state, comprised of a GAPS unit used in conjunction with an odometer and a memory device. U.S. Pat. No. 5,633,622 to Patterson discloses an electronic device for keeping a truck's log book information comprised of a keyboard and printer.

While these devices fulfill their respective, particular objective and requirements, the aforementioned patents do not describe a mileage and fuel purchase monitoring device for vehicles for allowing a vehicle's mileage and fuel purchases to be electronically monitored and stored.

In this respect, the mileage and fuel purchase monitoring device for vehicles according to the present invention substantially departs from the conventional concepts and designs of the prior art, and in doing so provides an apparatus primarily developed for the purpose of allowing a vehicle's mileage and fuel purchases to be electronically monitored and stored.

Therefore, it can be appreciated that there exists a continuing need for a new and improved mileage and fuel purchase monitoring device for vehicles which can be used for allowing a vehicle's mileage and fuel purchases to be electronically monitored and stored. In this regard, the present invention substantially fulfills this need.

SUMMARY OF THE INVENTION

In the view of the foregoing disadvantages inherent in the known types of electronic information systems for vehicles now present in the prior art, the present invention provides an improved mileage and fuel purchase monitoring device for vehicles. As such, the general purpose of the present invention, which will be described subsequently in greater detail, is to provide a new and improved mileage and fuel purchase monitoring device for vehicles which has all the advantages of the prior art and none of the disadvantages.

To attain this, the present invention essentially comprises a data collecting system that is connected with an odometer of a truck or other motor vehicle. The data collecting system is preferably secured to a dashboard of the truck for easy access by the driver. The data collecting system is provided with a keyboard and a display for entering relevant information related to a planned trip to be made. The data collecting system is also provided with a disk receiving port that can receive a computer disk therein. The computer disk is compatible with other computers.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mileage and fuel purchase monitoring device for vehicles which has all the advantages of the prior art electronic information systems for vehicles and none of the disadvantages.

It is another object of the present invention to provide a new and improved mileage and fuel purchase monitoring device for vehicles which may be easily and efficiently manufactured and marketed.

It is a further object of the present invention to provide a new and improved mileage and fuel purchase monitoring device for vehicles which is of durable and reliable construction.

An even further object of the present invention is to provide a new and improved mileage and fuel purchase monitoring device for vehicles which is susceptible of a low cost of manufacture with regard to both materials and labor, and which accordingly is then susceptible of low prices of sale to the consuming public, thereby making such a mileage and fuel purchase monitoring device for vehicles economically available to the buying public.

Even still another object of the present invention is to provide a new and improved mileage and fuel purchase monitoring device for vehicles for allowing a vehicle's mileage and fuel purchases to be electronically monitored and stored.

Lastly, it is an object of the present invention to provide a new and improved mileage and fuel purchase monitoring device for vehicles including a data collecting system that is connected with an odometer of a truck or other motor vehicle. The data collecting system is preferably secured to a dashboard of the truck for easy access by the driver. The data collecting system is provided with a keyboard and a display for entering relevant information related to a planned trip to be made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
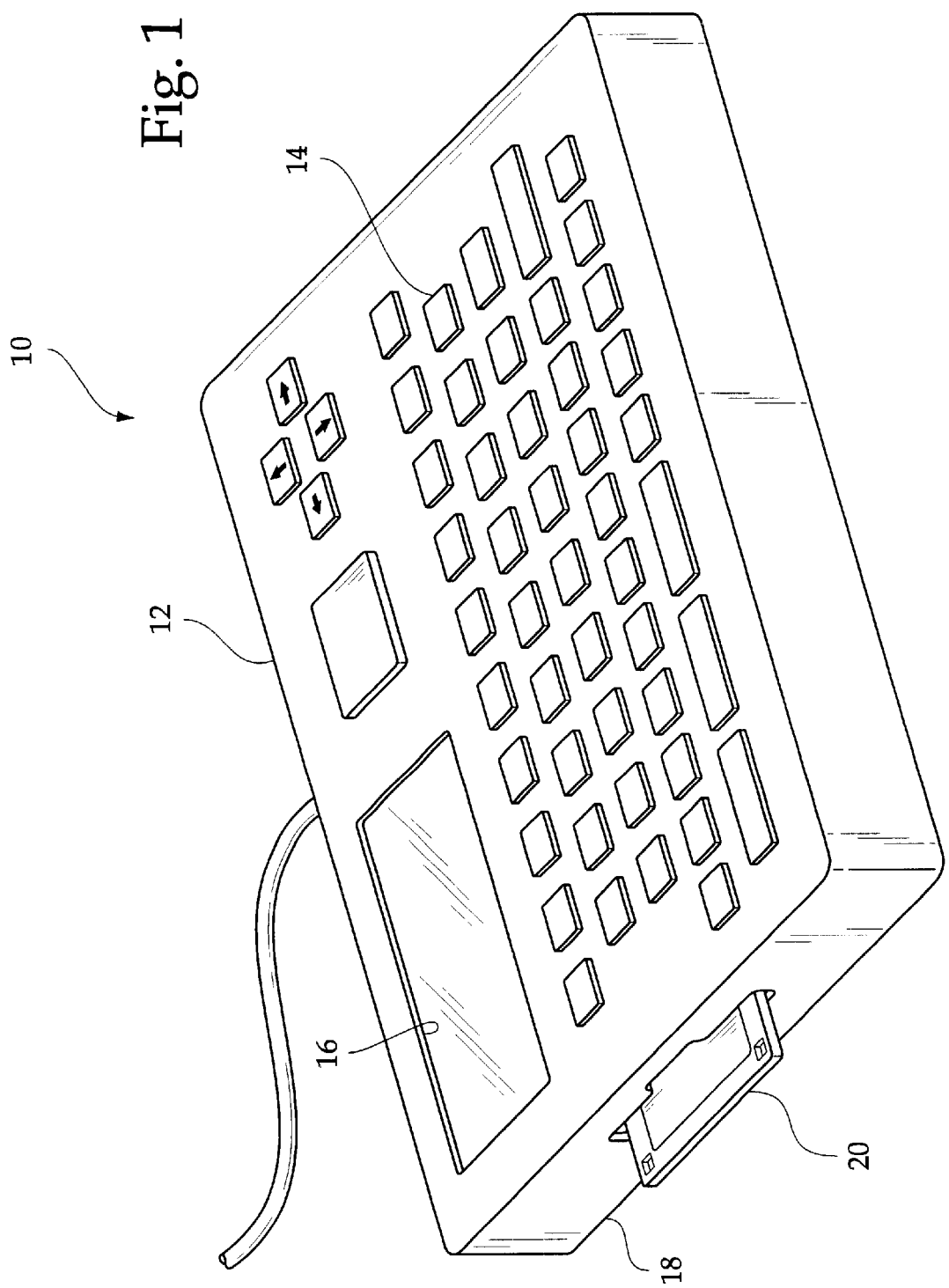
FIG. 1 is a perspective view of the preferred embodiment of the mileage and fuel purchase monitoring device for vehicles constructed in accordance with the principles of the present invention.
Figure 3:
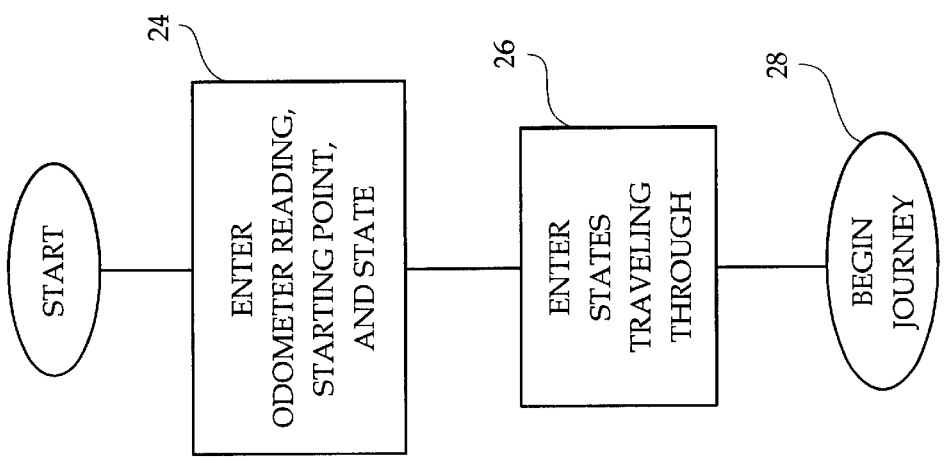
FIG. 3 is an illustration an overall method of operation of the present invention.

With reference now to the drawings, and in particular, to FIGS. 1 through 4 thereof, the preferred embodiment of the new and improved mileage and fuel purchase monitoring device for vehicles embodying the principles and concepts of the present invention and generally designated by the reference number 10 will be described.

Specifically, it will be noted in the various figures that the device relates to a mileage and fuel purchase monitoring device for vehicles for allowing a vehicle's mileage and fuel purchases to be electronically monitored and stored.

The present invention is essentially comprised of a data collecting system 12 (see FIG. 1) that is connected with an odometer of a truck or other motor vehicle. The data collecting system 12 is preferably secured to a dashboard of the truck for easy access by the driver. The data collecting system 12 is provided with a keyboard 14 and a display 16 for entering relevant information related to a planned trip to be made. The data collecting system 12 is also provided with a disk receiving port 18 that can receive a computer disk 20 therein. The computer disk 20 is compatible with other computers. The computer disk 20 can store all relevant information for retrieval at a later time. Additionally, the present invention is hooked up with the Global Positioning System to allow the location of the device 10 to be tracked at all times.

To use the present invention, the trucker will first enter the current odometer reading, geographic starting point and state 24 into the data collecting system 12. Next, the driver then enters all of the states that he will drive through in sequence 26 into the data collecting system 12. These steps are outlined in FIG. 3. The use of the Global Positioning System could allow the user to avoid having to enter all of the states into the system 12.

The present invention then functions as the trip commences 28. Note FIG. 4. As the truck passes over a state line 30, the Global Positioning System will detect this happening. This will allow the mileage traveled within the prior state to be recorded 34. If the driver refuels 36 while in a state, the state where refueling 38 can be entered via the keyboard 14 to correlate miles traveled with a quantity of fuel purchased. Additionally, if the driver pays any road tolls while in a particular state, this information can be entered for the particular state. When the trip has ended 40, the driver enters in the place and state 42 into the data collecting system 12. Next, the information can be stored on the computer disk 20 or printed out on a data sheet 22. The functioning of the data collecting system 12 ends 44 at this point until the next trip is commenced. Note FIG. 3.

Figure 2:
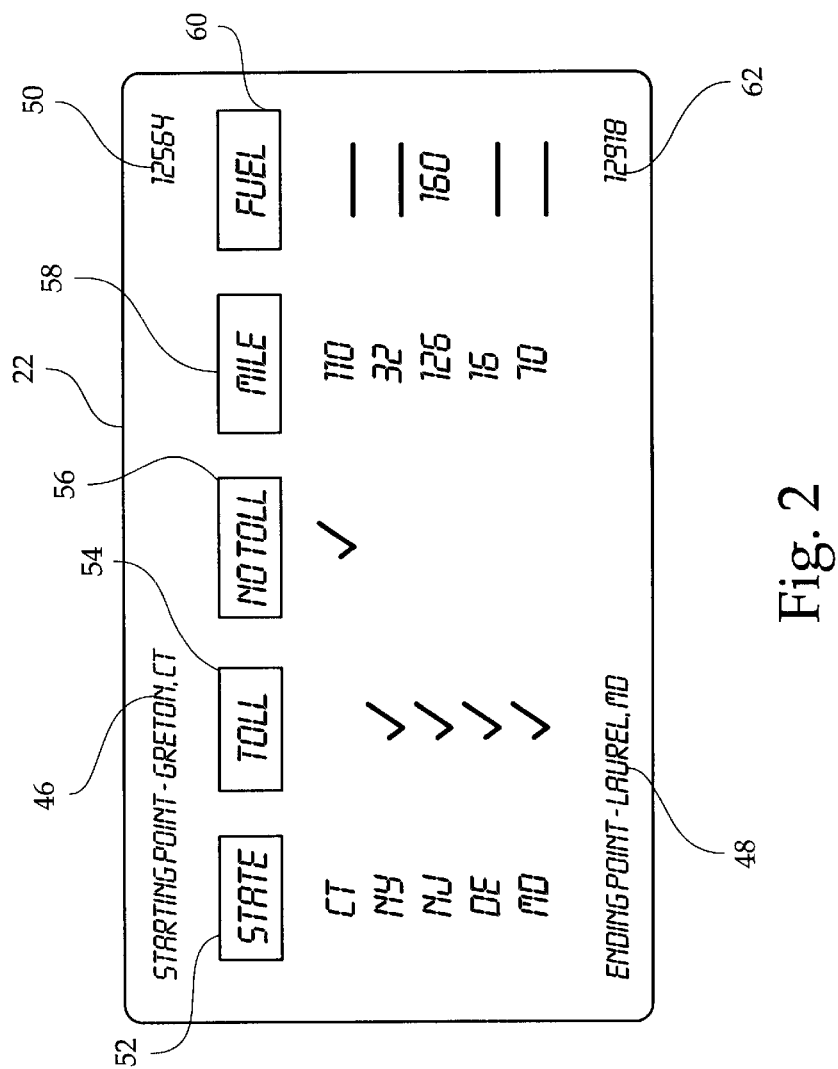
FIG. 2 is a plan view of an illustration of a printout of the present invention.
Figure 4:
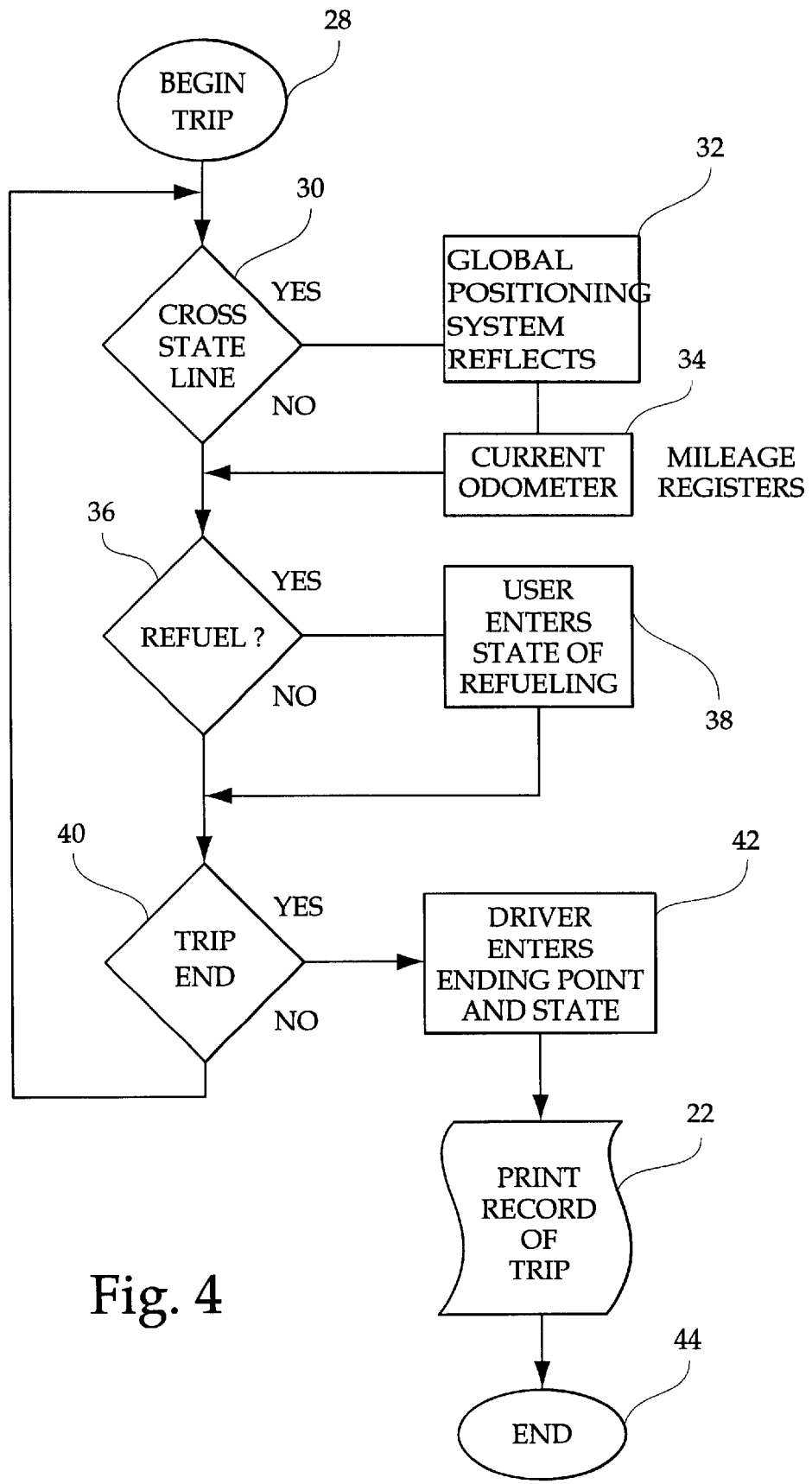
FIG. 4 is an illustration of a specific method of the present invention.

The data sheet 22, as illustrated in FIG. 2, illustrates the starting point 46 and ending point 48 for the particular journey. Associated with the starting point 46 will be the current odometer reading 50 of the vehicle. The data sheet 22 will include a column for the states that have been traveled through 52. Included with each state will be data related to tolls 54, if there were any, paid within the state. If there were no tolls paid while in the state, this will be noted in a separate column 56. Also noted are the number of miles traveled within each state 58. Additionally, the data sheet 22 includes a listing of fuel purchased 60, if any, while in a particular state. The data collecting system 12 will correlate miles traveled with the amount of fuel purchased. Lastly, the data collecting system 12 will total the amount of miles traveled within all of the states 62 and print this total next to the ending point 48 for the journey.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mileage and fuel purchase monitoring device and method for vehicles for allowing a vehicle's mileage and fuel purchases to be electronically monitored and stored, the method comprising, in combination:

providing a data collecting system for coupling with the vehicle;

connecting the data collecting system with an odometer of the vehicle;

programming current mileage of the odometer into the data collecting system;

inputting a geographic starting point and state for a trip into the data collecting system;

inputting selected states that the vehicle will travel through during the trip into the data collecting system;

beginning the trip; and inputting that the vehicle has entered a different of said selected states when said vehicle has entered said selected states.

2. The mileage and fuel purchase monitoring device and method for vehicles as set forth in claim 1, and further including means for entering a quantity of fuel into the data collecting system.

3. The mileage and fuel purchase monitoring device and method for vehicles as set forth in claim 1, and further including means for entering an end point for the trip into the data collecting system.

4. The mileage and fuel purchase monitoring device and method for vehicles as set forth in claim 1, and further including means for printing a record for the trip.

5. The mileage and fuel purchase monitoring device and method for vehicles as set forth in claim 1, and further including means for storing a record for the trip on a transferable disk.

6. The mileage and fuel purchase monitoring device and method for vehicles as set forth in claim 1, and further including means for entering tolls paid while in particular states during the trip into the data collecting system.

* * * * *